(12) United States Patent
Chen (10) Patent No.: US 10,041,782 B2
(45) Date of Patent: Aug. 7, 2018

(54) APPARATUS FOR MEASURING LENGTH OF OPTICAL RESONANT CAVITY

(71) Applicant: INDUSTRIAL TECHNOLOGY RESEARCH INSTITUTE, Hsinchu (TW)

(72) Inventor: Sheng-Jui Chen, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 14/981,567

(22) Filed: Dec. 28, 2015

(65) Prior Publication Data

US 2017/0146337 A1 May 25, 2017

(30) Foreign Application Priority Data

Nov. 23, 2015 (TW) .............................. 104138835 A (51) Int. Cl.
  *G01B 11/02* (2006.01)
  *G01M 11/08* (2006.01)
  *G01B 11/16* (2006.01)

(52) U.S. Cl.
  CPC ............ *G01B 11/02* (2013.01); *G01B 11/026* (2013.01); *G01M 11/083* (2013.01)

(58) Field of Classification Search
  CPC .... G01B 9/02003; G01B 11/02; G01B 11/161
  See application file for complete search history.

(56) References Cited

U.S. PATENT DOCUMENTS 3,770,352 A * 11/1973 White ..................... H01S 3/121
                                                              356/133
4,122,408 A   10/1978 Walls
                  (Continued)

FOREIGN PATENT DOCUMENTS

CN          1301400 C       2/2007
CN       100445697 C      12/2008
                  (Continued)

OTHER PUBLICATIONS

English Translation of Zhang et al. CN102288103, Jun. 27, 2011.*
(Continued)

*Primary Examiner* — Dominic J Bologna
(74) *Attorney, Agent, or Firm* — Rabin & Berdo, P.C.

(57) ABSTRACT

An apparatus for measuring a length of an optical resonant cavity includes a frequency tunable light source, a beam splitter, a frequency modulator and an optical resonant cavity. The frequency tunable light source emits a beam. The beam splitter is disposed on the optical path of the beam for dividing the beam into a first beam and a second beam. The frequency of the second beam is modulated by the frequency modulator to differ from the frequency of the first beam by a beat frequency. The optical resonant cavity is disposed on the main optical path of the first beam and the main optical path of the modulated second beam. The first beam and the modulated second beam enter the optical resonant cavity for measuring a length of the optical resonant cavity, and a variation in cavity length is calculated from the beat frequency.

14 Claims, 5 Drawing Sheets

(56) References Cited

U.S. PATENT DOCUMENTS

| | | | |
|---|---|---|---|
| 4,449,825 A * | 5/1984 | May | G01J 9/04 356/484 |
| 4,907,237 A | 3/1990 | Dahmani et al. | |
| 5,177,633 A * | 1/1993 | Wong | G01J 9/04 356/484 |
| 5,565,987 A | 10/1996 | Jain et al. | |
| 6,400,738 B1 * | 6/2002 | Tucker | G02B 7/1822 359/260 |
| 6,713,743 B2 * | 3/2004 | Kim | B82Y 35/00 250/201.3 |
| 6,882,429 B1 | 4/2005 | Weitekamp et al. | |
| 7,319,527 B2 | 1/2008 | Frederix et al. | |
| 7,940,400 B2 | 5/2011 | Lopushansky et al. | |
| 9,638,513 B2 * | 5/2017 | Rembe | G01B 11/14 |
| 2006/0072119 A1 * | 4/2006 | Hill | G03F 7/70775 356/500 |
| 2010/0149545 A1 * | 6/2010 | Aeppli | G01B 11/165 356/501 |
| 2013/0100973 A1 | 4/2013 | Bondu et al. | |
| 2014/0374575 A1 * | 12/2014 | Takesue | G01J 1/44 250/208.5 |

FOREIGN PATENT DOCUMENTS

| | | |
|---|---|---|
| CN | 102013622 A | 4/2011 |
| CN | 102288103 B | 7/2013 |
| CN | 104266593 A | 1/2015 |
| TW | I437208 B | 5/2014 |

OTHER PUBLICATIONS

Taiwanese Office Action dated Oct. 28, 2016.
B. W. Hoogenboom et al., "A Fabry-Perot interferometer for micrometer-sized cantilevers", Applied Physics Letters 86, 074101, Feb. 8, 2005.
H. Kawakatsu et al., "Towards Atomic Force Microscopy up to 100 MHz", Review of Scientific Instruments, vol. 73, No. 6, Jun. 2002.
Taiwanese Office Action dated Apr. 24, 2017.
Taiwanese Office Action dated Jan. 4, 2018.

* cited by examiner

APPARATUS FOR MEASURING LENGTH OF OPTICAL RESONANT CAVITY

This application claims the benefit of Taiwan application Serial No. 104138835, filed on Nov. 23, 2015, the disclosure of which is incorporated by reference herein in its entirety.

TECHNICAL FIELD

The technical field relates in general to an apparatus for measuring a length of an optical resonant cavity.

BACKGROUND

One of the most popular methods for measuring the displacement caused by oscillation of a micro cantilever is the optical beam deflection method, which has been widely used in commercialized atomic force microscopes (AFM). Since the optical beam deflection method lacks direct traceability for displacement variation, and a comparison calibration method is needed for converting deflection into unit of length, namely meter. Besides, the optical beam deflection method cannot optimize both the detection sensitivity and the spot size of detection light at the same time. That is, the smaller the spot size, the larger the magnification factor of the focusing lens, and the worse the detection sensitivity.

SUMMARY

The disclosure is directed to an apparatus for measuring a displacement or a length of an optical resonant cavity. In an embodiment, the apparatus can be used in the length-measuring technique for measuring a deformation of a micro cantilever.

According to one embodiment, an apparatus for measuring a length of an optical resonant cavity is provided. The apparatus includes a frequency tunable light source, a beam splitter, a frequency modulator and an optical resonant cavity. The frequency tunable light source emits a beam. The beam splitter is disposed on the optical path of the beam for dividing the beam into a first beam and a second beam. The frequency modulator is disposed on the main optical path of the second beam. The frequency of the second beam is modulated by the frequency modulator to differ from the frequency of the first beam by a beat frequency. The optical resonant cavity is disposed on the main optical path of the first beam and the main optical path of the modulated second beam. The first beam and the modulated second beam enter the optical resonant cavity for measuring a length of the optical resonant cavity, and a variation of cavity length is calculated from the beat frequency.

According to an apparatus for measuring a length of an optical resonant cavity is provided. The apparatus includes two frequency tunable light sources, an absolute optical frequency measuring module, and an optical resonant cavity. The two frequency tunable light sources emit a first beam and a second beam, respectively, wherein the absolute frequency of the first beam is different from the absolute frequency of the second beam. The absolute optical frequency measuring module measures a beat frequency between the absolute optical frequencies of the first beam and the second beam and the two absolute optical frequencies. The optical resonant cavity is disposed on the main optical path of the first beam and the main optical path of the second beam. The first beam and the second beam enter the optical resonant cavity for measuring a length of the optical resonant cavity, and a variation in cavity length is calculated from the beat frequency.

The above and other aspects of the disclosure will become better understood with regard to the following detailed description of the preferred but non-limiting embodiment(s). The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION OF THE EMBODIMENTS

In an embodiment of the disclosure, an apparatus for measuring a cavity length is disclosed. The apparatus uses a structure of a Fabry-Perot interferometer to measure deformation of a cantilever. Refer to the embodiment shown in FIG. 1A. The optical resonant cavity 115 consists of a reflective surface 122 of the cantilever 121 and a reflective surface 124 of the reflector 123. In the present embodiment, the reflective surface 124 is a reflective curved surface, but the disclosure is not limited thereto. The length L of the optical resonant cavity 115 is a distance between the reflective surface 122 and the reflective curved surface 124. The lens group 125 is disposed between the optic fiber 114 and the reflector 123 for adjusting the wavefront of the light, provided from the optic fiber 114, to match a transverse mode of the resonant cavity and increasing the coupling efficiency of the optical field to the resonant cavity.

Figure 1A:
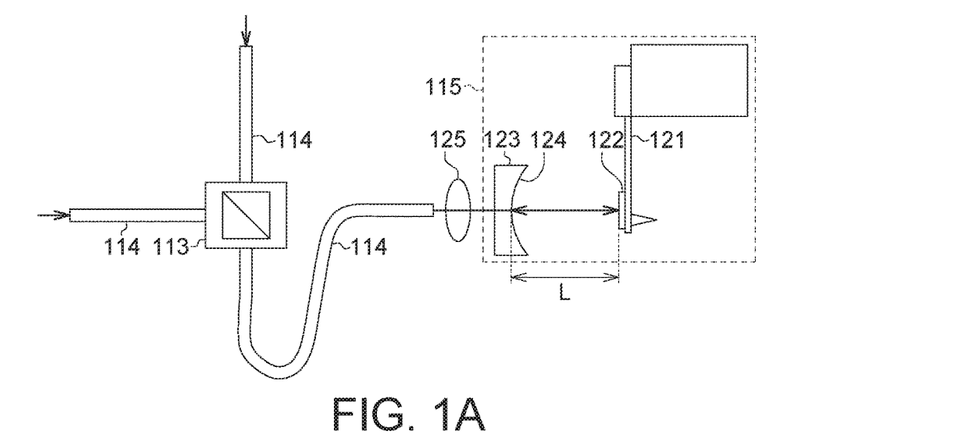
FIG. 1A is a schematic diagram of an optical resonant cavity according to an embodiment of the disclosure.
Figure 1B:
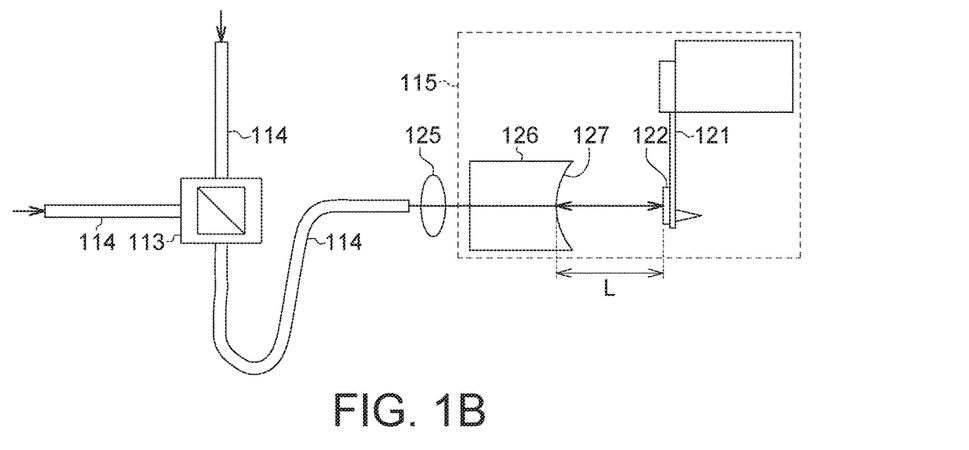
FIG. 1B is a schematic diagram of another implementation of an optical resonant cavity.

Referring to the embodiment shown in FIG. 1B, a schematic diagram of another implementation of an optical resonant cavity 115 is shown. The optical resonant cavity 115 consists of a reflective surface 122 of the cantilever 121 and a reflective curved surface 127 of the cylindrical lens 126. The cavity length L is a distance between the reflective surface 122 and the reflective curved surface 127. The lens group 125 is disposed between the optic fiber 114 and the cylindrical lens 126 for adjusting the wavefront of the light, provided from the optic fiber 114, to match the transverse mode of the resonant cavity and increasing the coupling efficiency of the optical field to the resonant cavity. In an embodiment, both the diameter and the thickness of the cylindrical lens 126 are equivalent to 5 mm; the reflective curved surface 127 has a radius of curvature of 3 mm; the cavity length is less than 1 mm, and the spot of the light projected on the cantilever 121 has a radius roughly around 6 to 15 micrometers (μm).

Figure 1C:
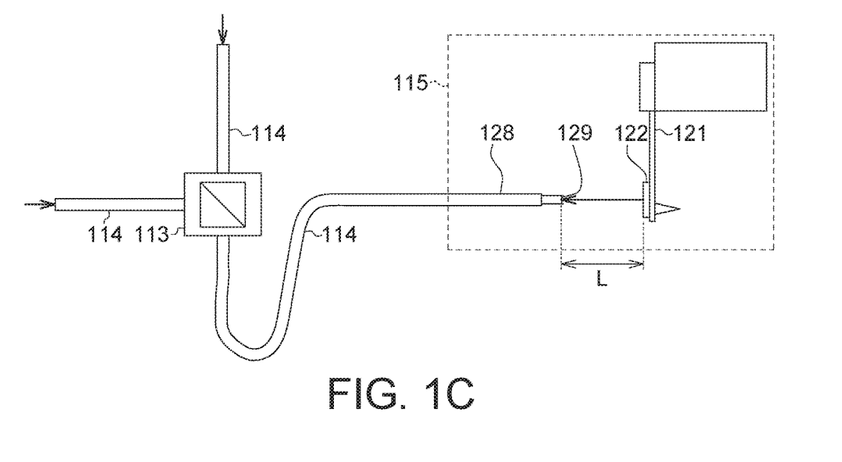
FIG. 1C is a schematic diagram of another implementation of an optical resonant cavity.

Referring to the embodiment shown in FIG. 10, a schematic diagram of another implementation of an optical resonant cavity 115 is shown. The optical resonant cavity 115 consists of a reflective surface 122 of the cantilever 121 and a reflective surface 129 at an end of the optical fiber 128 (such as a reflective coating surface formed by coating process at the end of the optical fiber 128). In an embodiment, the reflective surface 129 may be a curved surface which is formed by performing curving process at the end of the optic fiber 128. But, the scope of the present disclosure is not limited thereto.

The resolution for measuring a length of the optical resonant cavity 115 is determined according to the fineness (F) of the optical resonant cavity 115. The relationship between the fineness F and reflectances R1 and R2 of two reflective surfaces of the optical resonant cavity 115 can be expressed as:

$$F = \frac{\pi(R_1 R_2)^{1/4}}{1-(R_1 R_2)^{1/2}}$$

When the reflectances of the two reflective surface are equivalent to each other, that is, R1=R2=R, the fineness F can be expressed as:

$$F = \frac{\pi\sqrt{R}}{1-R}$$

The relationship between the input light intensity $I_0$ and the output light intensity $I_t$ of the optical resonant cavity 115 can be expressed as:

$$I_t = \frac{I_0}{1+\frac{4F^2}{\pi^2}\sin^2\left(\frac{2\pi}{\lambda}L\right)}$$

When the cavity length L varies, the output light intensity $I_t$ may changes periodically. In the resonant mode, a relationship between a full width at half maximum (FWHM) ΔL and the wavelength λ of the input light can be expressed as:

$$\Delta L = \frac{\lambda/2}{F}$$

Wherein the FWHM ΔL can be determinate as a basic capability for resolving the optical displacement of the cavity.

Figure 2:
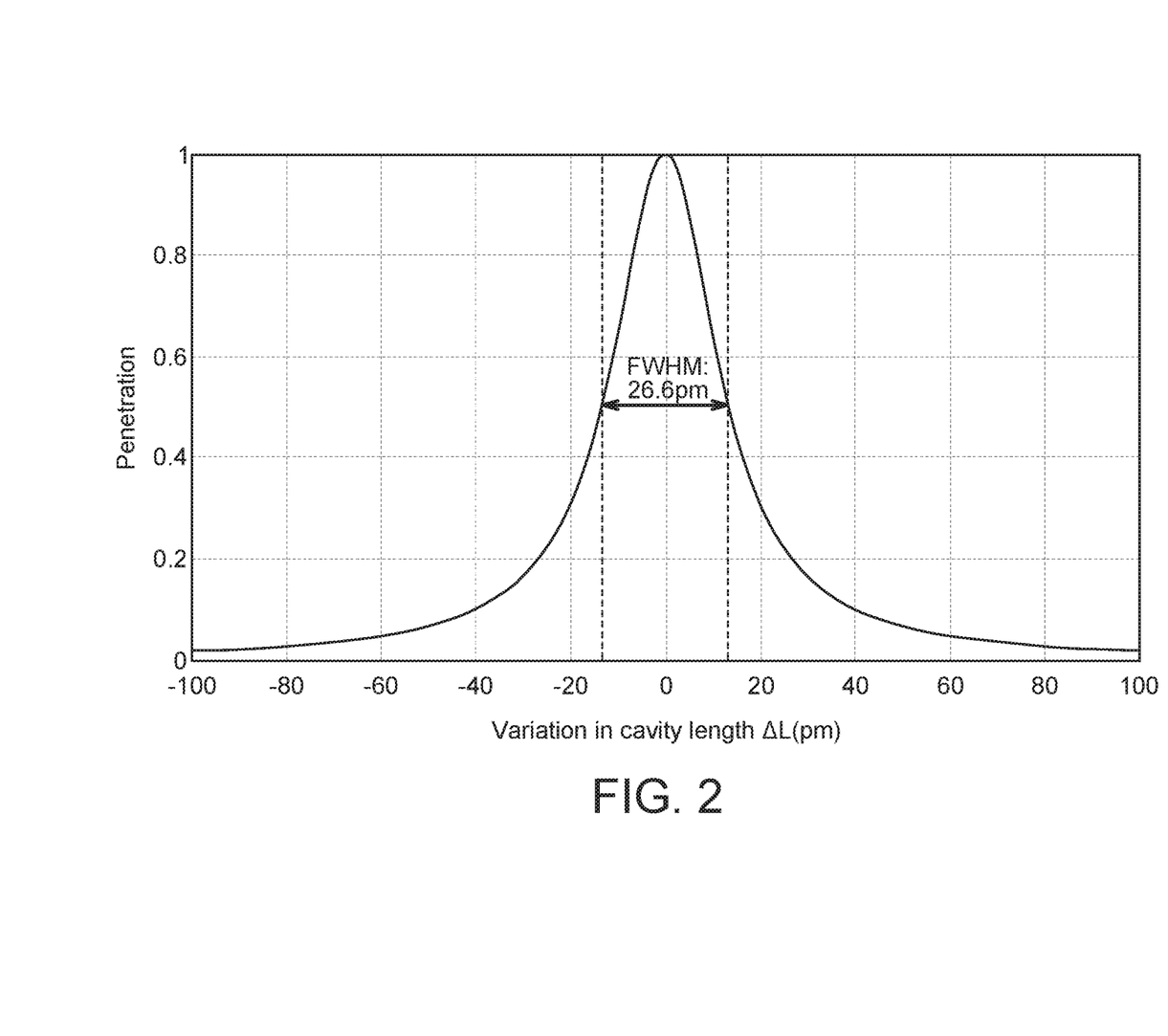
FIG. 2 is a relationship diagram of transmission of the optical resonant cavity vs. variation of cavity length when fineness F is 10,000 and the light source has a wavelength of 532 nm.

When the reflectance R is greater than 0.9997, the fineness F can be greater than 10,000, and the FWHM ΔL calculated by using an input light source with a wavelength of 532 nm is equivalent to 26.6 picometers (pm), that is ΔL=26.6 pm. Therefore, the basic resolution for resolving the optical displacement can reach tens of picometers, and the resolution can further be improved to several picometers when frequency analysis is used. Referring to FIG. 2, a relationship diagram of transmission of the optical resonant cavity vs. variation of cavity length when fineness F is 10,000 and the light, for measuring, has a wavelength of 532 nm is shown. The FWHM ΔL is equivalent to 26.6 pm.

The apparatus of the disclosure is exemplified by two types of apparatuses for measuring a length of an optical resonant cavity. Detailed descriptions of embodiments of the disclosure are disclosed below, and the embodiments of the disclosure are for exemplary and explanatory purposes only, not for limiting the scope of protection of the disclosure.

First Embodiment

Figure 3:
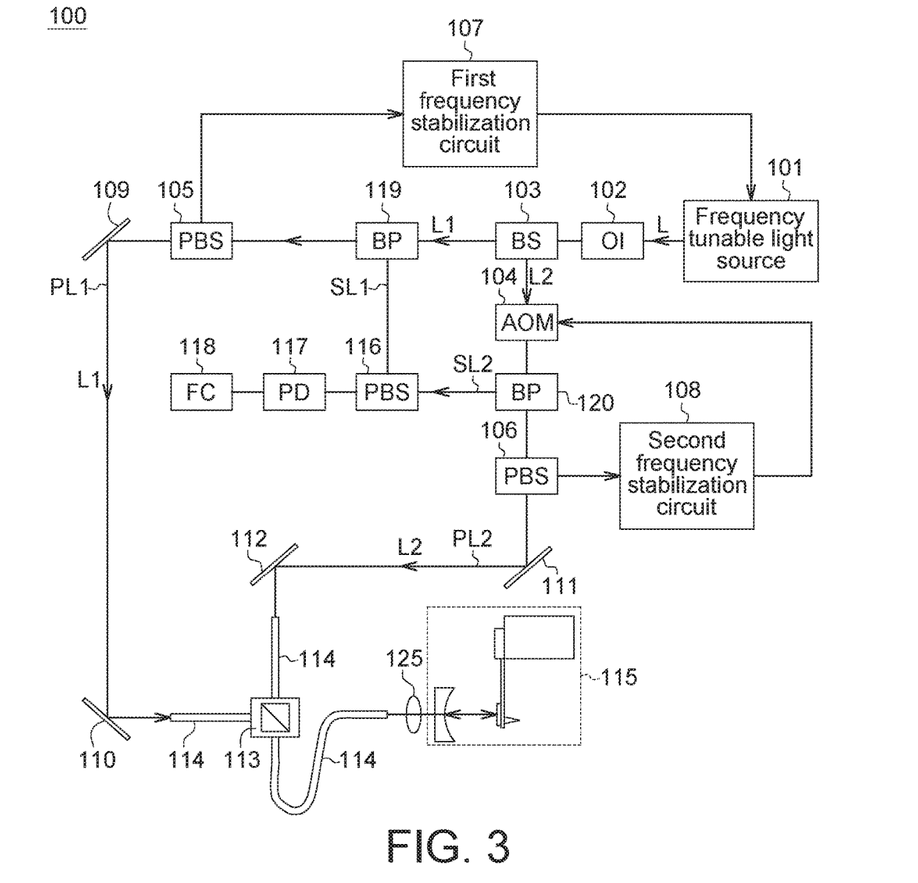
FIG. 3 is a schematic diagram of an apparatus for measuring a length of an optical resonant cavity according to an embodiment of the disclosure.

Referring to FIG. 3, a schematic diagram of an apparatus for measuring a length of an optical resonant cavity 100 according to an embodiment of the disclosure is shown. The apparatus for measuring a length of an optical resonant cavity 100 may include a frequency tunable light source 101, an optical isolator 102, a main beam splitter 103, a frequency modulator 104, a first polarized beam splitter 105, a second polarized beam splitter 106, a first frequency stabilization circuit 107, a second frequency stabilization circuit 108, a first planar reflector 109, a second planar reflector 110, a third planar reflector 111, a fourth planar reflector 112, a polarized beam combined mirror 113, an optic fiber 114, an optical resonant cavity 115, a third polarized beam splitter 116, a photoelectric sensor 117, a frequency counter 118, a first sampler 119 and a second sampler 120.

In the embodiment, the frequency tunable light source 101 emits a beam L, such as a laser light with a wavelength of 532 nm. The optical isolator 102 and the main beam splitter 103 are disposed on the optical path of the beam L. After the beam L passes through the optical isolator 102, the beam L is divided into a first beam L1 and a second beam L2 by the main beam splitter 103.

The first polarized beam splitter 105, the first sampler 119, the first planar reflector 109, the second planar reflector 110, the polarized beam combined mirror 113, the optic fiber 114 and the optical resonant cavity 115 are disposed on the main optical path PL1 of the first beam L1 in sequence. The first frequency stabilization circuit 107 connects the frequency tunable light source 101 and the main optical path PL1 of the first beam L1 in a circle. Besides, the first polarized beam splitter 105 is disposed at an intersection between the main optical path PL1 of the first beam L1 and the first frequency stabilization circuit 107, such that a portion of the first beam L1 can be reflected by the first polarized beam splitter 105 to enter the first frequency stabilization circuit 107. The first sampler 119 is disposed at an intersection between the main optical path PL1 and the branch optical path SL1 of the first beam L1 for capturing the first beam L1 and enabling the first beam L1 to enter the branch optical path SL1. Also, some commonly used optical elements, such as phase modulator, half-wave plate, and Faraday rotator mirror (not illustrated in the diagram), can be disposed on the main optical path PL1 of the first beam L1 to increase the stability of the optical system.

Besides, the frequency modulator 104, the second sampler 120, the second polarized beam splitter 106, the third planar reflector 111, the fourth planar reflector 112, the polarized beam combined mirror 113, the optical fiber 114 and the optical resonant cavity 115 are disposed on the main optical path PL2 of the second beam L2 in sequence. The second frequency stabilization circuit 108 connects the frequency modulator 104 and the main optical path PL2 of the second beam L2 in a circle. The second polarized beam splitter 106 is disposed at an intersection between the main optical path PL2 of the second beam L2 and the second frequency stabilization circuit 108, such that a portion of the second beam L2 can be reflected by the second polarized beam splitter 106 to enter the second frequency stabilization circuit 108. The second sampler 120 is disposed at an intersection between the main optical path PL2 and the branch optical path SL2 of the second beam L2 for capturing the second beam L2 and enabling the second beam L2 to enter the branch optical path SL2. Also, some commonly used optical elements, such as phase modulator, half-wave plate, and Faraday rotator mirror (not illustrated in the diagram), can be disposed on the main optical path PL2 of the second beam L2 to increase the stability of the optical system.

Moreover, the photoelectric sensor 117 is disposed on a branch optical path SL1 of the first beam L1 and a branch optical path SL2 of the modulated second beam L2 for detecting the light intensity of a portion of the first beam L1 reflected by the third polarized beam splitter 116 and the light intensity of a portion of the second beam L2 penetrating the third polarized beam splitter 116, and for generating a beat signal on the photoelectric sensor 117. The frequency counter 118 is coupled to the photoelectric sensor 117 for measuring the frequency of the beat signal (the beat frequency $f_b$).

Refer to FIG. 3. The frequency of the first beam L1 is the frequency of the beam L emitted from the frequency tunable light source 101. After passing through each of the optical elements sequentially disposed on the main optical path PL1 of the first beam L1, the first beam L1 lastly enters the optical resonant cavity 115 comprising two reflector surfaces. A frequency difference between the first beam L1 and the optical resonant cavity 115 can be calculated by the photoelectric sensor and the demodulator of the first frequency stabilization circuit 107. Then, after the frequency difference is amplified by the loop filter, the amplified frequency difference is transmitted to the frequency tunable light source 101 and used as a control signal of the frequency tunable light source 101, such that the frequency of the first beam L1 is locked at a resonant frequency $Nv_{fsr}$ of the optical resonant cavity 115.

The frequency $f_1$ of the first beam L1 can be obtained from the following equation (1):

$$f_1 = N \frac{c}{2nL} = Nv_{fsr} \qquad (1)$$

Wherein, N, an integer which represents a longitudinal mode modulus; n represents a refractive index of the medium inside the optical resonant cavity; L represents the length of the optical resonant cavity 115; c represents light speed; $v_{fsr}$ represents a free spectral range; $Nv_{fsr}$ represents a resonant frequency.

Refer to FIG. 3. The frequency of the second beam L2 is modulated by the frequency modulator 104 to generate an extra frequency offset $Mv_{fsr}$ (M is also an integer). After passing through each of the optical element sequentially disposed on the main optical path PL2 of the second beam L2, the modulated second beam L2 lastly enters the optical resonant cavity 115 which consists of two reflector surfaces. A frequency difference between the second beam L2 and the optical resonant cavity 115 can be obtained from the photoelectric sensor and the demodulator of the second frequency stabilization circuit 108. Then, after the frequency difference is amplified by the loop filter, the amplified frequency difference is fed back to the frequency modulator 104 and used as a control signal of the frequency modulator 104, such that the frequency of the second beam L2 is locked at another resonant frequency $(N+M)v_{fsr}$ of the optical resonant cavity 115.

The frequency $f_2$ of the second beam L2 can be obtained from the following equation (2):

$$f2 = (N+M)\frac{c}{2nL} = (N+M)v_{fsr} \qquad (2)$$

According to the equations (1) and (2), a frequency difference between the frequency $f_1$ of the first beam L1 and the frequency $f_2$ of the second beam L2 (hereafter named as beat frequency $f_b$) can be obtained from the following equation (3):

$$f_b = M\frac{c}{2nL} = Mv_{fsr} \qquad (3)$$

Wherein, M represents a difference between the two resonant frequencies $Nv_{fsr}$ and $(N+M)v_{fsr}$.

Therefore, the length of the optical resonant cavity 115 can be obtained by calculating the frequency difference between the frequency $f_1$ of the first beam L1 and the frequency $f_2$ of the second beam L2 (the beat frequency $f_b$). Furthermore, the variation of the length L of the optical resonant cavity 115 can be represented by the variation of the beat frequency as follows:

$$\delta L = -L\left(\frac{\delta f_b}{f_b}\right) \qquad (4)$$

Based on the calculation result of formula (4), variation of the length of the optical resonant cavity 115 (that is, variation of the distance between two reflector surfaces) is a deflection displacement (deformation) of the cantilever 121.

In an embodiment, the first frequency stabilization circuit 107 and the second frequency stabilization circuit 108 may utilize Pound-Drever-Hall (PDH) frequency stabilization technique, in which the resonant frequency of the Fabry-Perot (F-P) optical resonant cavity 115 is used as a reference frequency. After a beam is phase modulated, a first differential and a discriminator characteristic are obtained by using an optical heterodyne beat frequency technique and the resonance characteristic of the F-P resonant cavity. Then, a feedback system is used to control and lock the frequency of the beam at a resonant frequency of the optical resonant cavity 115.

As aforementioned, an embodiment of the disclosure provides a length measuring technique applicable to an optical resonant cavity of a micro cantilever and capable of converting an absolute displacement into a frequency variation. When the absolute frequency of the light source is unknown, the variation of cavity length still can be calculated from beat frequency (that is, frequency difference). The length measuring technique of the disclosure possesses features such as high direct traceability, high displacement resolution, and high responsive bandwidth.

Second Embodiment

Figure 4:
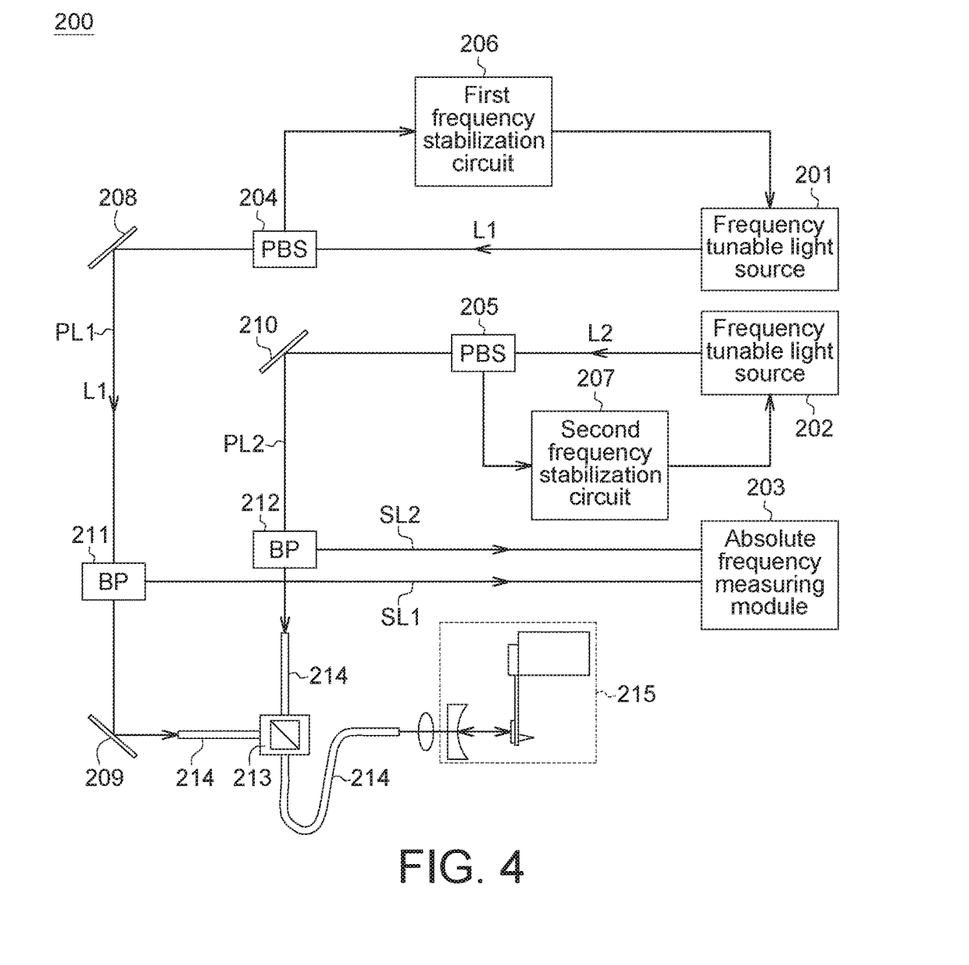
FIG. 4 is a schematic diagram of an apparatus for measuring a length of an optical resonant cavity according to an embodiment of the disclosure.

Referring to FIG. 4, a schematic diagram of an apparatus for measuring a length of an optical resonant cavity 200 according to an embodiment of the disclosure is shown. The apparatus for measuring a length of an optical resonant cavity 200 may include two frequency tunable light sources 201 and 202, an absolute optical frequency measuring module 203, a first polarized beam splitter 204, a second polarized beam splitter 205, a first frequency stabilization circuit 206, a second frequency stabilization circuit 207, a first planar reflector 208, a second planar reflector 209, a third planar reflector 210, a first sampler 211, a second sampler 212, a polarized beam combined mirror 213, an optic fiber 214 and an optical resonant cavity 215. Detailed descriptions of the optical resonant cavity 215 are made with reference to the optical resonant cavity 115 of FIGS. 1A-1C, and are not repeated here.

The two frequency tunable light sources 101 generate a first beam L1 and a second beam L2, respectively. The first beam L1 and the second beam L2 have different optical frequencies, and each can be selected from a laser light with a wavelength of 500-600 nm.

The first polarized beam splitter 204, the first planar reflector 208, the first sampler 211, the second planar reflector 209, the polarized beam combined mirror 213, the optic fiber 214 and the optical resonant cavity 215 are disposed on the main optical path PL1 of the first beam L1 in sequence. The first frequency stabilization circuit 206 connects the frequency tunable light source 201 and the main optical path PL1 of the first beam L1 in a circle. Additionally, the first polarized beam splitter 204 is disposed at an intersection between the main optical path PL1 of the first beam L1 and the first frequency stabilization circuit 206, such that a portion of the first beam L1 can be reflected by the first polarized beam splitter 204 to enter the first frequency stabilization circuit 206. The first sampler 211 is disposed at an intersection between the main optical path PL1 and the branch optical path SL1 of the first beam L1 for capturing the first beam L1 and enabling the first beam L1 to enter the absolute optical frequency measuring module 203. Also, some commonly used optical elements, such as phase modulator, half-wave plate, and Faraday rotator mirror (not illustrated in the diagram), can be disposed on the main optical path PL1 of the first beam L1 to increase the stability of the optical system.

Furthermore, the second polarized beam splitter 205, the third planar reflector 210, the second sampler 212, the polarized beam combined mirror 213, the optic fiber 214 and the optical resonant cavity 215 are disposed on the main optical path PL2 of the second beam L2 in sequence. The second frequency stabilization circuit 207 connects another frequency tunable light source 202 and the main optical path PL2 of the second beam L2 in a circle. The second polarized beam splitter 205 is disposed at an intersection between the main optical path PL1 of the second beam L2 and the second frequency stabilization circuit 207, such that a portion of the second beam L2 can be reflected by the second polarized beam splitter 205 to enter the second frequency stabilization circuit 207. The second sampler 212 is disposed at an intersection between the main optical path PL2 and the branch optical path SL2 of the second beam L2 for capturing the second beam L2 and enabling the first beam L2 to enter the absolute optical frequency measuring module 203. Also, some commonly used optical elements, such as phase modulator, half-wave plate, and Faraday rotator mirror (not illustrated in the diagram), can be disposed on the main optical path PL2 of the second beam L2 to increase the stability of the optical system.

Moreover, the absolute optical frequency measuring module 203 is disposed on the branch optical path SL1 of the first beam L1 and the branch optical path SL2 of the second beam L2 for measuring a beat frequency between the absolute optical frequencies of the first beam L1 and the second beam L2 and the two absolute optical frequencies. Therefore, the length of the optical resonant cavity 215 can be measured by calculating the frequency difference (the beat frequency $f_b$) between the frequency $f_1$ of the first beam L1 and the frequency $f_2$ of the second beam L2.

In an embodiment, when the length of the optical resonant cavity 215 is at millimeter level, the first frequency stabilization circuit 206 can be used to lock the frequency of the first beam L1 at a resonant frequency $Nv_{fsr}$ of the optical resonant cavity 215, and the second frequency stabilization circuit 207 can be used to lock the frequency of the second beam L2 at the other resonant frequency $(N+M)v_{fsr}$ of the optical resonant cavity 215. However, since the frequency difference (the beat frequency $f_b$) between the two resonant frequencies will fall within tens of GHz and cannot be detected by the frequency counter 118, absolute optical frequency measurement will be used instead.

In an embodiment, the absolute optical frequency measuring module 203 can use the optical frequency comb as a reference frequency for directly measuring the frequency difference (the beat frequency) between the absolute optical frequencies of the first beam L1 and the second beam L2 and the two absolute optical frequencies, the cavity length L can be obtained from formula (3). Moreover, the variation in length of the optical resonant cavity 215 can be represented by the variation in beat frequency as follows:

$$\delta L = -L\left(\frac{\delta(f_1 - f_2)}{f_1 - f_2}\right)$$

In an embodiment, the absolute optical frequency measuring module 203 may include two photoelectric sensors and two frequency counters (not illustrated in the diagram). The two photoelectric sensors receive a light from the first beam L1 and a light from the second beam L2, respectively. The optical frequency comb works with the first beam L1 and the second beam L2 to generate two beat signals on the two photoelectric sensors respectively, and the frequencies of the beat signals can be measured by respective frequency counter.

As disclosed above, the disclosure provides a length measuring technique applicable to an optical resonant cavity of a micro cantilever and capable of converting absolute displacement into frequency variation. When absolute frequency of the light source is unknown, the variation in cavity length still can be calculated from the beat frequency (that is, frequency difference). The length measuring technique of the disclosure possesses features such as high direct traceability, high displacement resolution, and high responsive bandwidth.

According to the disclosure, variation in cavity length can be obtained without using phase nulling or continuous integration. Therefore, techniques of phase nulling and continuous integration used in the conventional length measuring heterodyne optical interferometer can be omitted in the present disclosure. Although the light source has been shielded for a period of time or has been turned off, as long as the light source is turned on again, displacement information still can be obtained by measuring the beat frequency or absolute optical frequencies. The absolute optical frequencies of the two frequency tunable light sources can be used as another basis of length measurement. Therefore, the disclosure can provide double measurement results for cross reference and double check.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An apparatus for measuring a length of an optical resonant cavity, comprising:
   a frequency tunable light source for emitting a beam;
   a beam splitter disposed on the optical path of the beam for dividing the beam into a first beam and a second beam;
   a frequency modulator disposed on a main optical path of the second beam, wherein a frequency of the second beam is modulated by the frequency modulator to differ from a frequency of the first beam by a beat frequency;
   a first frequency stabilization circuit connected with the frequency tunable light source and the main optical path of the first beam in a circle for locking the frequency of the first beam at a first resonant frequency of the optical resonant cavity;
   a second frequency stabilization circuit connected with the frequency modulator and the main optical path of the second beam in a circle for locking the frequency of the second beam at a second resonant frequency of the optical resonant cavity;
   a photoelectric sensor disposed on a branch optical path of the first beam and a branch optical path of the modulated second beam for capturing a light intensity of a portion of the first beam and a light intensity of a portion of the second beam to generate a beat signal;
   a frequency counter coupled to the photoelectric sensor for calculating the beat frequency from the beat signal; and
   an optical resonant cavity disposed on a main optical path of the first beam and the main optical path of the modulated second beam, wherein the first beam and the modulated second beam enter the optical resonant cavity for measuring a length of the optical resonant cavity, and a variation in cavity length is calculated from the beat frequency.

2. The cavity length measuring apparatus according to claim 1, further comprising:
   a first sampler disposed at an intersection between the main optical path of the first beam and the branch optical path of the first beam for capturing and enabling the first beam to enter the branch optical path of the first beam; and
   a second sampler disposed at an intersection between the main optical path of the second beam and the branch optical path of the second beam for capturing and enabling the second beam to enter the branch optical path of the second beam.

3. The cavity length measuring apparatus according to claim 1, further comprising:
   a first polarized beam splitter disposed at an intersection between the main optical path of the first beam and the first frequency stabilization circuit, such that a portion of the first beam is reflected by the first polarized beam splitter to enter the first frequency stabilization circuit; and
   a second polarized beam splitter disposed at an intersection between the main optical path of the second beam and the second frequency stabilization circuit, such that a portion of the second beam is reflected by the second polarized beam splitter to enter the second frequency stabilization circuit.

4. The cavity length measuring apparatus according to claim 1, wherein the relationship between the length of the optical resonant cavity and the beat frequency can be expressed as:

$$L = \frac{Mc}{2n} \frac{1}{f_b}$$

wherein, L represents a length of the optical resonant cavity; M, an integer, represents a resonant modulus difference between the first resonant frequency and the second resonant frequency; n represents a refractive index of a medium inside the optical resonant cavity; c represents light speed; $f_b$ represents a beat frequency.

5. The cavity length measuring apparatus according to claim 1,
   wherein the optical resonant cavity comprises a reflective surface of a cantilever and a reflective surface of a cylindrical lens, and the length of the optical resonant cavity is a distance between the reflective surface of the cantilever and the reflective surface of the cylindrical lens.

6. The cavity length measuring apparatus according to claim 1,
   wherein the optical resonant cavity comprises a reflective surface of a cantilever and a reflective surface on the exit of an optical fiber, and the length of the optical resonant cavity is a distance between the reflective surface of the cantilever and the reflective surface of the optical fiber.

7. The cavity length measuring apparatus according to claim 1, wherein the optical resonant cavity comprises a reflective surface of a cantilever and a reflective surface of a reflector mirror, and the length of the optical resonant cavity is a distance between the reflective surface of the cantilever and the reflective surface of the reflector mirror.

8. An apparatus for measuring a length of an optical resonant cavity, comprising:
   two frequency tunable light sources for emitting a first beam and a second beam, respectively, wherein an optical frequency of the first beam is different from an optical frequency of the second beam;
   a first frequency stabilization circuit connecting with one of the two frequency tunable light sources and the main optical path of the first beam in a circle for locking the frequency of the first beam at a first resonant frequency of the optical resonant cavity;
   a second frequency stabilization circuit connecting with the other one of the two frequency tunable light sources and the main optical path of the second beam in a circle for locking the frequency of the second beam at a second resonant frequency of the optical resonant cavity;
   an absolute optical frequency measuring module using an optical frequency comb as a reference frequency for measuring a beat frequency between the absolute optical frequencies of the first beam and the second beam and the two absolute optical frequencies; and
   an optical resonant cavity disposed on a main optical path of the first beam and a main optical path of the second beam, wherein the first beam and the second beam enter the optical resonant cavity for measuring a length of the optical resonant cavity, and a variation in cavity length is calculated from the beat frequency.

9. The cavity length measuring apparatus according to claim 8, further comprising:
   a first sampler disposed at an intersection between the main optical path of the first beam and a branch optical path of the first beam for capturing the first beam and enabling the first beam to enter the absolute optical frequency measuring module; and
   a second sampler disposed at an intersection between the main optical path of the second beam and a branch optical path of the second beam for capturing the second beam and enabling the second beam to enter the absolute optical frequency measuring module.

10. The cavity length measuring apparatus according to claim 8, further comprising:
   a first polarized beam splitter disposed at an intersection between the main optical path of the first beam and the first frequency stabilization circuit, such that a portion of the first beam is reflected by the first polarized beam splitter to enter the first frequency stabilization circuit; and
   a second polarized beam splitter disposed at an intersection between the main optical path of the second beam and the second frequency stabilization circuit, such that a portion of the second beam is reflected by the second polarized beam splitter to enter the second frequency stabilization circuit.

11. The cavity length measuring apparatus according to claim 8, wherein the length of the optical resonant cavity and the beat frequency can be expressed as:

$$L = \frac{Mc}{2n}\frac{1}{f_b}$$

wherein, L represents a length of the optical resonant cavity; M, an integer, represents a resonant modulus difference between the first resonant frequency and the second resonant frequency; n represents a refractive index of the medium inside the optical resonant cavity; c represents light speed; $f_b$ represents a beat frequency.

12. The cavity length measuring apparatus according to claim 8,
   wherein the optical resonant cavity comprises a reflective surface of a cantilever and a reflective surface of a cylindrical lens, and the length of the optical resonant cavity is a distance between the reflective surface of the cantilever and the reflective surface of the cylindrical lens.

13. The cavity length measuring apparatus according to claim 8,
   wherein the optical resonant cavity comprises a reflective surface of a cantilever and a reflective surface on the exit of an optical fiber, the length of the optical resonant cavity is a distance between the reflective surface of the cantilever and the reflective surface of the optical fiber.

14. The cavity length measuring apparatus according to claim 8, wherein the optical resonant cavity comprises a reflective surface of a cantilever and a reflective surface of a reflector mirror, and the length of the optical resonant cavity is a distance between the reflective surface of the cantilever and the reflective surface of the reflector mirror.

* * * * *